May 13, 1952  C. F. LOCKHART  2,596,778
AUTOMATIC TRAIN PIPE CONNECTOR
Filed Aug. 21, 1947  3 Sheets-Sheet 3
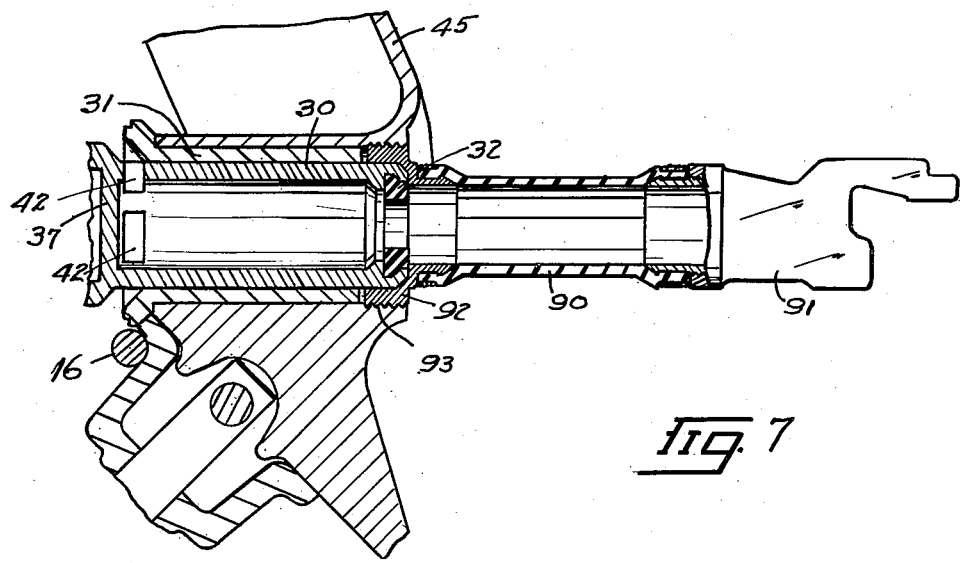
Fig. 7
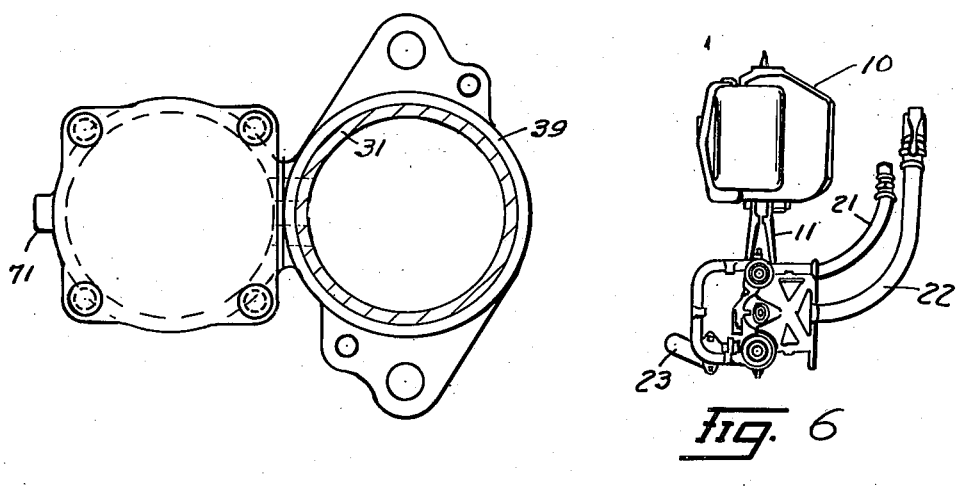
Fig. 5
Fig. 6
INVENTOR.
CHARLES F. LOCKHART
BY
Bates, Teare, & McBean
ATTORNEYS Patented May 13, 1952

2,596,778

UNITED STATES PATENT OFFICE 2,596,778

AUTOMATIC TRAIN PIPE CONNECTOR

Charles F. Lockhart, Cleveland, Ohio

Application August 21, 1947, Serial No. 769,963

3 Claims. (Cl. 284—5)

This invention relates to train pipe connectors and particularly to those that are adapted to be attached to the usual couplers for effecting automatic connection of the air, signal and brake conduits, and of the steam conduits.

An object of the present invention is to provide mechanism for automatically releasing the brake pipe pressure to the atmosphere so as to set the brakes whenever a car to which the automatic connector is attached is disconnected from an adjacent car. The invention also contemplates a construction by means of which the atmospheric release will be automatically cut off after the lapse of a predetermined period of time, thereby enabling the brake to be released and the parts of the unit to be set for recharging the brake pipe and for a succeeding coupling operation.

A structure intended for carrying out the aforesaid object is illustrated, described and claimed in Letters Patent of the United States No. 2,296,170 which was issued to me on December 15, 1942. Accordingly, a further object of the present invention is to improve on the construction set forth in said patent so as to simplify the construction and to assure satisfactory operation under all conditions of use.

Figure 1:
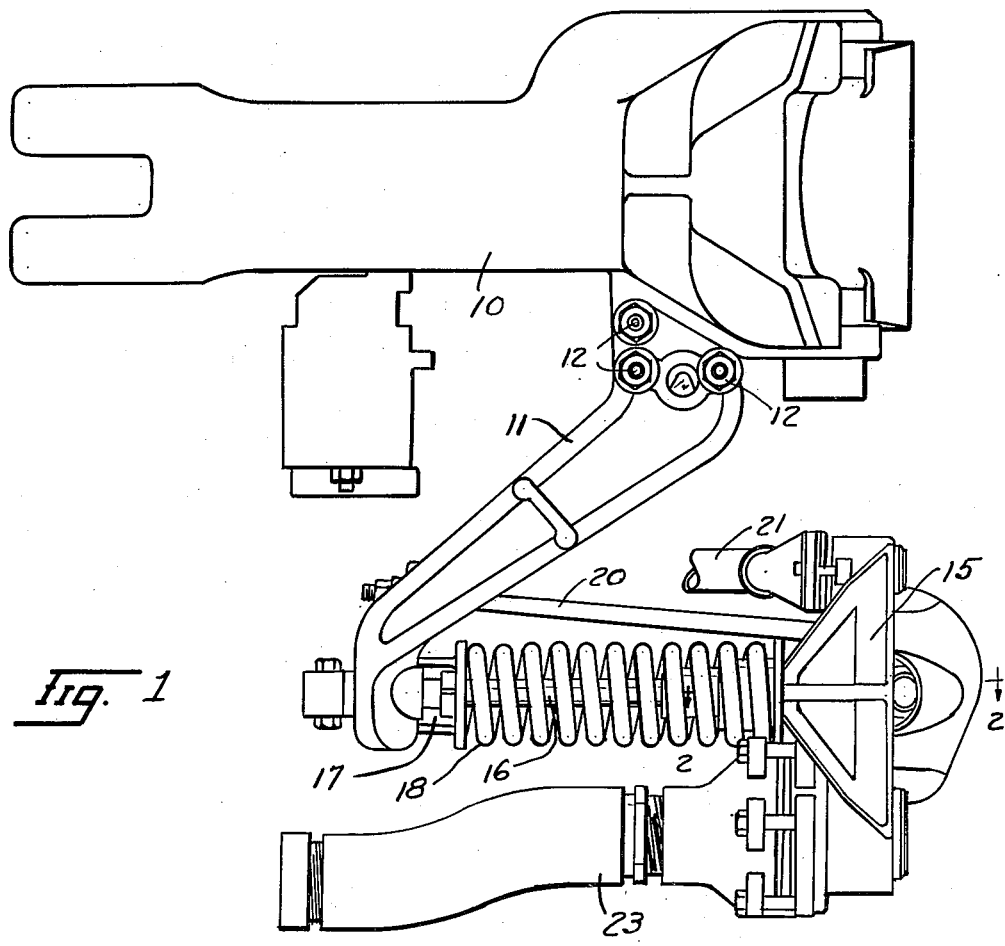
Figure 4:
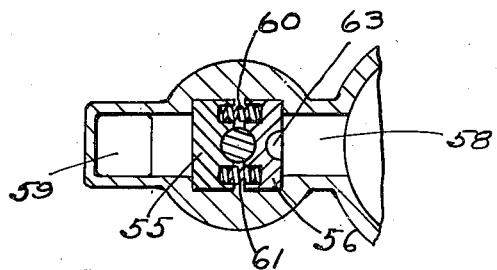
Figure 2:
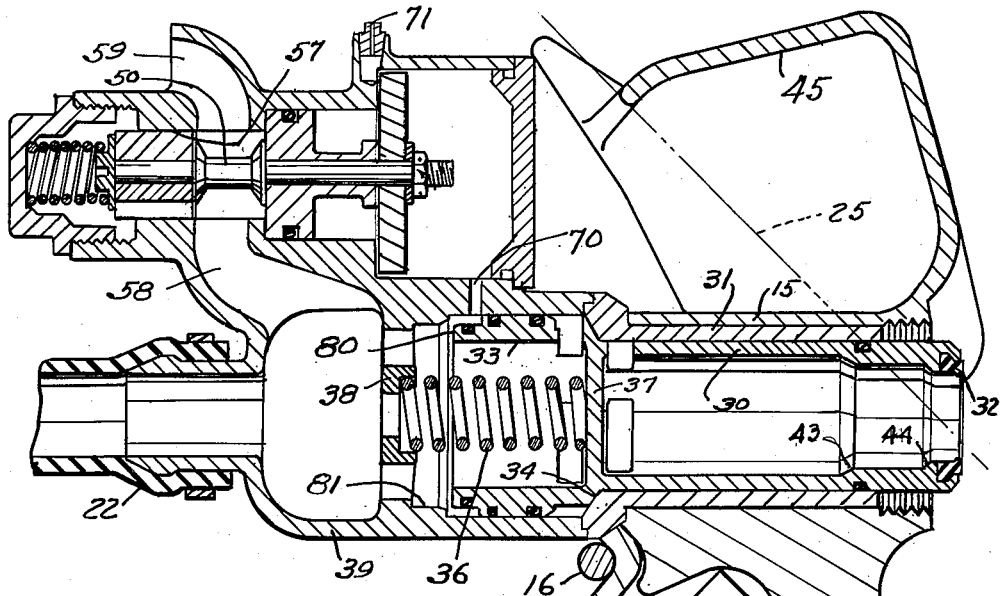
Figure 3:
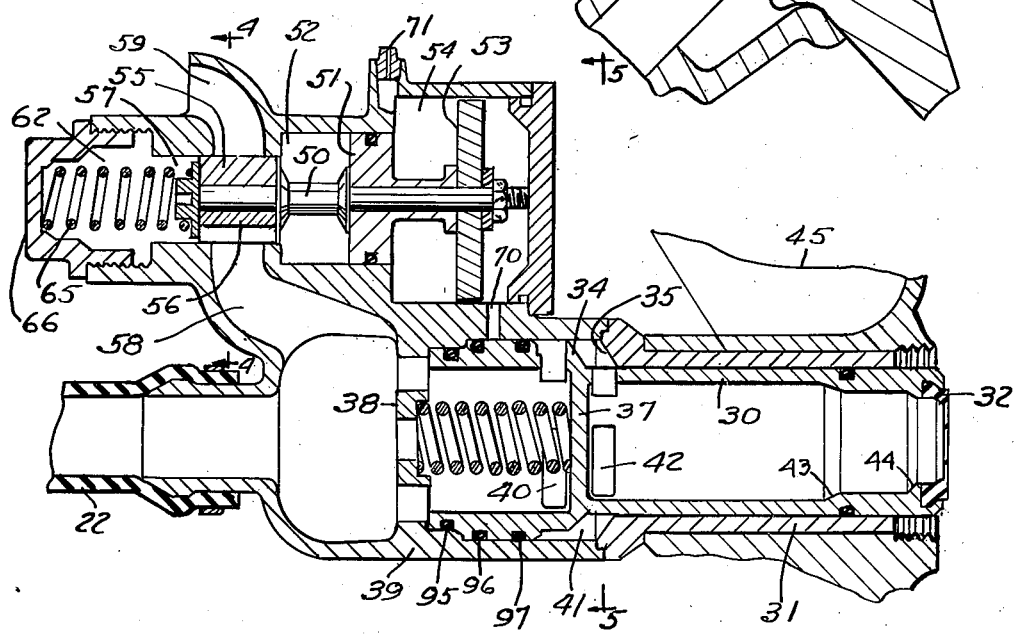

Referring now to the drawings, Fig. 1 is a side view of an automatic train pipe connector embodying the present invention; Fig. 2 is a section taken on a horizontal plane through part of a connector head on the line 2—2 of Fig. 1 and showing the connector in uncoupled position; Fig. 3 is a section similar to that of Fig. 2 but showing the valve mechanism in coupled position; Fig. 4 is a section taken on the plane indicated by the line 4—4 in Fig. 3; Fig. 5 is an elevational view of the airbrake release mechanism taken on the plane 5—5 in Fig. 3; Fig. 6 is a front view of a coupler having a connector embodying the present invention attached thereto, and Fig. 7 is a horizontal section through a connector head embodying the present invention and illustrating the use of an interchange conduit for enabling connection to be made to a car that is not equipped with an automatic train pipe connector.

In Fig. 1, 10 indicates a car coupler to which a bracket 11 is attached by securing members 12. The lower end of the bracket supports the connector which is shown as having a head, indicated in general at 15, and a shank 16 which extends through a member 17 that has a connection with the bracket so as to permit universality of movement of the connector head with respect to the bracket. A spring 18, interposed between the member 17 and the head, operates to urge the head forwardly, while a bar 20, having one end attached to the head and the other end slidably mounted in the bracket, holds the head in proper vertical position for effecting automatic coupling.

The connector head has provision for attachment to the air signal conduit 21, to the air brake conduit 22 and to the steam conduit 23, respectively. The signal and steam conduits emerge from the head at substantially a right angle to the plane of the meeting face of the head, whereas the air brake conduit emerges from the head at an angle of about 45° with respect to the plane of the meeting face of the head, as is best illustrated in Fig. 2, where the plane of the meeting face is shown by the dot and dash line 25. A connector head having such general configuration is shown and described in Letters Patent of the United States No. 1,347,836, issued July 27, 1920, to M. A. Barber.

The present invention includes a main control valve which is adapted to be opened whenever the connector heads are coupled so as to permit the flow of air brake air automatically therethrough, and to be closed automatically whenever the heads are disconnected. The invention additionally includes an auxiliary emergency release valve which operates, whenever the main valve is seated, to release the brake pipe pressure to the atmosphere and thereby to set the brakes. The invention additionally includes an arrangement by means of which the atmospheric release will be automatically cut off after a predetermined length of time, thereby enabling the brakes to be released and the parts to be set automatically for recharging the brake pipes, and for the succeeding coupling operation.

The main control valve is best shown in Fig. 2 as a cylindrical member 30 which is movable axially within a sleeve 31 which, in turn, has a pressed fit within an aperture in the head 15. The forward end of the member 30 carries a gasket 32 which is adapted to abut a similarly shaped gasket that is carried in the forward end of a corresponding valve member in the mating head on the car to which the connector 15 is to be attached.

The member 30 has an enlargement 33 at the rearward end thereof which is connected to the reduced forward cylindrical portion by a frustro-conical portion 34, and such frustro-conical portion is adapted to engage a complementary shaped seat 35 adjacent the rearward end of the sleeve 31. The member 30 is normally urged to the closed position (illustrated in Fig. 2) by the spring 36, one end of which abuts a partition wall 37 between the portions 30 and 33, the other end of which abuts a spider 38 in the valve body 39. This is the position of the valve when the connector head is disconnected. Fig. 3 shows the position of the member 30 when the cars are coupled, at which time the valve parts 34 and 35 are spaced apart, thus allowing air to flow from the conduit 22 into the body 39, thence through ports 40 in the enlargement 33 into the space 41, thence through ports 42 into the interior of the cylinder 30 and thence into the corresponding conduit on a mating head.

When the cars are coupled and the air brake main valve is in the position shown in Fig. 3, the auxiliary valve mechanism, which is located at one side of the main valve and behind the projection 45 of the connector head is in the position shown in Fig. 3. Such auxiliary valve is illustrated as comprising a centrally disposed rod 50 which carries a piston 51 for operation within a chamber 52 and a piston 53 for operation in a chamber 54. The chambers 52 and 54 are formed in the valve body 39 in co-axial relationship, but are different in cross-sectional area. The rod 20 also carries a pair of blocks 55 and 56, which, as shown in Fig. 4, conjointly define a square in cross-section and are mounted for reciprocatory movement in a square passageway 57. One side of the passageway 57 is adapted to be placed in direct communication with the conduit 22 through passageway 58, and the other side of the passageway 57 is adapted to be placed in communication with the atmosphere through passageway 59.

The blocks 55 and 56 are normally urged away from each other by springs 60 and 61 which enter opposing pockets in the respective blocks, as illustrated in Fig. 4. In such position the block 55 cuts off communication between the atmosphere and the interior of the valve body, while the block 56 allows air from the conduit 22 to flow into the chambers 52 and 62 through a passageway 63 in the block 56. Thus, the pressure is equalized on opposite ends of the valve block 55 and the valve accordingly is urged forwardly by the spring 65. In addition, the pressure of the air in the conduit forces the piston 51 to the extreme forward extent of its movement, but inasmuch as all pistons and valve blocks are rigidly attached to the rod 50, they move as a unit with respect to the valve body.

Whenever the cars are disconnected, the spring 36 forces the main valve to close, and at such time uncovers a port 70, thereby allowing air under pressure to enter the chamber 54 on the forward side of the piston 53. Inasmuch, however, as the area of the piston 53 is greater than that of piston 51, the auxiliary valve member is forced rearwardly, thereby uncovering the passageway 59 and allowing the air in the conduit 22 to be exhausted suddenly to the atmosphere. The position of the auxiliary valve member at such time is illustrated in Fig. 2.

The release of air in the brake pipe line causes the emergency setting of the brakes on all cars. Such escape of air proceeds until the pressure in the conduit falls sufficiently to enable the spring 65, which abuts a cap 66, to move the auxiliary valve rod 50 and the parts connected thereto to the position shown in Fig. 3, whereupon further escape of air from the brake pipe through the passageway 59 is prevented. The return movement of the auxiliary valve is permitted by reason of the fact that the chamber 54 has a vent opening 71, while the piston 53 has clearance with the wall of the chamber so as to allow a slow movement of the auxiliary valve back to the position shown in Fig. 3. That movement occurs whenever the pressure in the brake conduit is sufficiently low that air may escape through the vent 71 at a sufficient rate to equalize the pressure on both sides of the piston 53.

In practice, each car of a train is provided with a triple valve, and each such valve is equipped with an emergency device which, after having once been set for operation, cannot be released for a period of about three minutes. This emergency device also operates to release air to the atmosphere and cooperates with the discharge passageway 59 in obtaining practically instantaneous application of the brakes when the cars are uncoupled. My emergency device will operate in less than one-third of the time required for the triple-valve emergency devices to complete their operation. This provides ample time for my emergency device to complete its cycle of operation and permits the parts of the complete valve mechanism to be reset in position which will permit the brake pipe line to the car to be recharged, before the emergency devices of the triple-valve can be released. For this purpose, the passageway 58 has a materially greater cross-sectional area than the port 70. Thus, as a result of apportioning of the cross-sectional areas of each port, and of the proper rate of leakage of air through the chamber 54, past the piston 53, the parts will remain in the position shown in Fig. 2, while the pressure in the air brake line is being built up after the venting operation even though the port 70 at this time is uncovered by the part 33. In practice, such leakage around the piston 53 is at a rate not to exceed seven pounds per minute as shown by the engineer's air pressure gauge on the locomotive, such leakage equalizing the pressure on both sides of the piston.

In the position shown in Fig. 2, the air flows into the passageway 70, at which time the skirt 80 on the end of the cylindrical portion 33 is positioned forwardly of a recess 81 in the rear of chamber 41. In the position of Fig. 3, however, the skirt has entered the recess and has effected a seal against the entrance of air into the port 70 as by O-rings 95 and 96 which are positioned in grooves rearwardly of the port 70, and by O-ring 97 which is positioned forwardly of the port 70.

For enabling a car having an automatic train pipe connector thereon to be connected to a car not so equipped, I have shown an interchange device in Fig. 7 as comprising a hose 90 to one end of which is attached a standard type of head 91 for connection to the conduit of an adjacent car. The other end of the hose 90 carries a head 92 which is threaded externally to engage corresponding internal threads 93 in the connector head. Thus, whenever the interchange hose is turned to effect an inner engagement of the threads, the main valve member 30 is forced inwardly thereby enabling the main valve to be opened against the force of the spring 36 and automatically effecting a fluid tight seal against the gasket 32. This operation may be accomplished without the necessity for tools and provides a simple and economical way of effecting an interchange connection.

An advantage of the present invention is the fact that the emergency release valve mechanism is simple in construction, has few working parts and is foolproof in operation. An advantage of the interchange is the ease with which the attachment may be made to the automatic connector against the pressure exerted by the spring of the main valve without the need for the use of extraneous means to compress the spring which normally operates to hold the valve seated.

The main control valve 30 which heretofore has been described as being axially movable within the sleeve 31 is so arranged that, when coupled with a mating coupling, the fluid pressure in the valve member acts to retain the valve member seated against the coacting valve member of the mating coupling. It will be noted from Fig. 2 that the internal diameter of the left hand portion of the valve member is greater than the internal diameters of the right hand portions and internal shoulders, such as shown at 43 and 44 in Fig. 2 are formed between the portions of the valve members. These shoulders face rearwardly, that is away from the mating coupling. Fluid pressure from the fluid line acts on the left hand face of the web 37 and the shoulders 43 and 44 and tends to move the valve member toward the right hand (Fig. 2) into coupling position. Accordingly, the greater the pressure in the fluid line the greater the force exerted on the valve member 30 to retain the member 30 of mating couplers seated one against the other.

I claim:

1. An automatic train pipe connector having a head with a fluid conduit extending therethrough for connection with the head of a mating connector, with the conduits in communication with each other, a main valve in said conduit to control passage of fluid therethrough, actuating means for said valve responsive to coaction with a mating connector to open the valve when the connectors are connected, means yieldably urging said valve to a closed position when the connectors are disconnected, a fluid passageway communicating with said conduit intermediate a pressure line and said valve and having a vent to the atmosphere, an auxiliary valve to control the flow of fluid in said passageway to said vent, an auxiliary valve housing therefor having an equalizing chamber and an actuating chamber, said equalizing chamber intersecting said passageway and being non-circular in cross section, a valve stem movably mounted within said chambers, said auxiliary valve comprising a pair of blocks disposed in fixed axial position one on either side of the stem's longitudinal axis within said equalizing chamber and movable with said stem to block said passageway, means yieldably separating the blocks and holding them against the walls of said equalizing chamber, means within said equalizing chamber yieldably urging said valve stem and blocks to block said vented passageway, one valve block being positioned adjacent the pressure line side of said passageway and having means placing the equalizing chamber in constant communication with the pressure line, a port connecting said actuating chamber with the pressure line through said fluid conduit, control means for said port carried by said main valve and positioned to open and close said port consequent upon the disconnection and connection respectively of the connectors, a piston on the stem spaced from said auxiliary valve and within said actuating chamber, said piston being responsive to fluid pressure to open said auxiliary valve and release the line pressure to the atmosphere when the connectors are disconnected.

2. An automatic train pipe connector having a head with a fluid conduit extending therethrough for connection with a conduit equipped head of a mating connector, with the conduits in communication with each other, a main valve in said conduit to control the passage of fluid therethrough, means responsive to connection and disconnection of the connectors for opening and closing said main valve, a fluid passageway communicating with said conduit intermediate a pressure line and said valve, and having a vent to the atmosphere, an auxiliary valve to control the flow of fluid in said passageway to said vent, an auxiliary valve chamber therefor intersecting said passageway, a valve stem movably mounted within said chamber, said auxiliary valve comprising a pair of blocks disposed in fixed axial position one on either side of the stem's longitudinal axis and movable with the stem to block and unblock said passageway, means yieldably separating the blocks and holding them against the walls of said chamber, means in one valve block positioned adjacent the pressure line side of said passageway placing the chamber in constant communication with the pressure line, and means responsive to fluid pressure from the pressure line and conduit to move said valve stem in a direction to open and close said auxiliary valve in the passageway when the connectors are disconnected and connected respectively.

3. In an automatic train pipe connector having a head with a fluid conduit extending therethrough for connection with a substantially identical mating connector having a similar head and conduit with the conduits in communication with each other, a main valve in said conduit to control passage of fluid therethrough, actuating means for said valve responsive to coaction with a mating connector to open the valve when the connectors are connected, means yieldably urging said valve to a closed position when the connectors are disconnected, a fluid passageway communicating with said conduit intermediate a pressure line and said valve and having a vent to the atmosphere, an auxiliary valve to control the flow of fluid in said passageway to said vent, an auxiliary valve housing therefor having a middle and two end aligned communicating chambers, said passageway intersecting the middle and one end chamber, a valve stem movably mounted within said chambers, said auxiliary valve comprising a pair of blocks disposed in fixed axial position one on either side of the stem's longitudinal axis within said one end chamber and movable with said stem to block and unblock the intersecting passageway, said blocks having parallel flat outwardly exposed faces, means yieldably separating the blocks and holding them against the walls of said one end chamber, means within said one end chamber yieldably urging said valve stem and blocks to block said vented passageway, one valve block being positioned adjacent the pressure line side of said passageway and having means placing said one end chamber and said middle chamber in constant communication with the pressure line, a port connecting said other end chamber with a pressure line through said fluid conduit, control means for said port carried by said main valve and positioned to open and close said port consequent upon the disconnection and connection respectively of the connectors, a first piston on the stem spaced from said auxiliary valve and within said other end chamber, said piston being responsive to fluid pressure to move said valve stem in a direction to open said auxiliary valve and release pressure in said conduit to the atmosphere when the connectors are disconnected, a second piston on the stem intermediate said first piston and auxiliary valve and within said middle chamber, said second piston having a lesser cross-sectional area than said first piston and being responsive to fluid pressure from the passageway to aid said yieldable means to urge the valve stem to block said passageway when the connectors are connected.

CHARLES F. LOCKHART.

REFERENCES CITED

The following references are of record in the file of this patent:

UNITED STATES PATENTS

| Number | Name | Date |
| --- | --- | --- |
| 873,947 | Kelly et al. | Dec. 17, 1907 |
| 906,981 | Witte | Dec. 15, 1908 |
| 1,386,235 | Brown | Aug. 2, 1921 |
| 1,805,646 | Thomas | May 19, 1931 |
| 2,296,170 | Lockhart | Sept. 15, 1942 |
| 2,337,096 | Geiger | Dec. 21, 1943 |